United States Patent [19]
Avansino

[11] Patent Number: 5,933,574
[45] Date of Patent: Aug. 3, 1999

[54] HEATED FLUID CONDUIT

[76] Inventor: Gary L. Avansino, 5998 Amargosa Dr., Sparks, Nev. 89433-6705

[21] Appl. No.: 09/020,917

[22] Filed: Feb. 9, 1998

[51] Int. Cl.$^6$ ........................................ H05B 3/58
[52] U.S. Cl. ............................................ 392/468; 219/535
[58] Field of Search .................................. 392/468, 473, 392/485, 487, 478; 219/506, 212, 541, 534, 535

[56] References Cited

U.S. PATENT DOCUMENTS

| | | | |
|---|---|---|---|
| 3,579,662 | 5/1971 | Lowry et al. | 4/206 |
| 3,784,785 | 1/1974 | Noland | 219/535 |
| 3,832,525 | 8/1974 | Stanton et al. | 219/301 |
| 3,851,149 | 11/1974 | Daley | 219/528 |
| 4,214,147 | 7/1980 | Kraver | 219/535 |
| 4,581,521 | 4/1986 | Grise | 219/535 |
| 4,874,925 | 10/1989 | Dickenson | 219/509 |
| 5,544,275 | 8/1996 | Ebbing et al. | 392/465 |

*Primary Examiner*—Teresa Walberg
*Assistant Examiner*—Gregory A. Wilson
*Attorney, Agent, or Firm*—David L. Volk

[57] ABSTRACT

A fluid conduit has a first end and a second end. An insulating cover surrounds the fluid conduit. An elongated heat trace tape is captured between the insulating cover and the fluid conduit. A source conductor extends outwardly from the insulating cover near the second end of the fluid conduit and is electrically connected to the heat trace tape. The source conductor is terminated by a fuse configured to prevent current through the heat trace tape from exceeding a pre-determined amount. A plug and power cord conveys power from a power source through the source conductor to the heat trace tape. An alarm is electrically connected to the heat trace tape and configured to energize when current through the heat trace tape is halted. A light emitting diode is electrically connected to the heat trace tape and adapted to energize when the plug is connected to the power source. A tail end of the heat trace tape extends outwardly from the insulating cover near the first end of the fluid conduit. The tail end of the heat trace tape is terminated by a waterproof end cap.

3 Claims, 4 Drawing Sheets

HEATED FLUID CONDUIT

BACKGROUND OF THE INVENTION

1. Field of the Invention

The present invention relates to heated fluid conduits.

2. Description of the Related Art

Water supplies to recreational vehicles and trailers sometimes become frozen in the winter-time. This results in interruption of water supply, and can also result in cracked and broken hoses and piping.

A way known in the prior art to overcome this problem is to wrap heat tracing tape around the hose and piping connections, and wrap insulation around the hose and the heat tracing tape. This process is cumbersome and time consuming, is subject to faulty installation, and requires the purchase of multiple products. If the heat trace fails, the hose and piping are still subject to freezing, without the user being aware of the problem.

SUMMARY OF THE INVENTION

The heated fluid conduit of the present invention includes a fluid conduit having a first end and a second end. An insulating cover surrounds the fluid conduit. An elongated heat trace tape is captured between the insulating cover and the fluid conduit. A source conductor extends outwardly from the insulating cover near the second end of the fluid conduit and is electrically connected to the heat trace tape. The source conductor is terminated by a fuse configured to prevent current through the heat trace tape from exceeding a pre-determined amount. A plug and power cord conveys power from a power source through the source conductor to the heat trace tape. All alarm is electrically connected to the heat trace tape and configured to energize when current through the heat trace tape is halted. A light emitting diode is electrically connected to the heat trace tape and adapted to energize when the plug is connected to the power source.

A tail end of the heat trace tape extends outwardly from the insulating cover near the first end of the fluid conduit. The tail end of the heat trace tape is terminated by a waterproof end cap.

Still further features and advantages will become apparent from the ensuing description and drawings.

DETAILED DESCRIPTION

Figure 1:
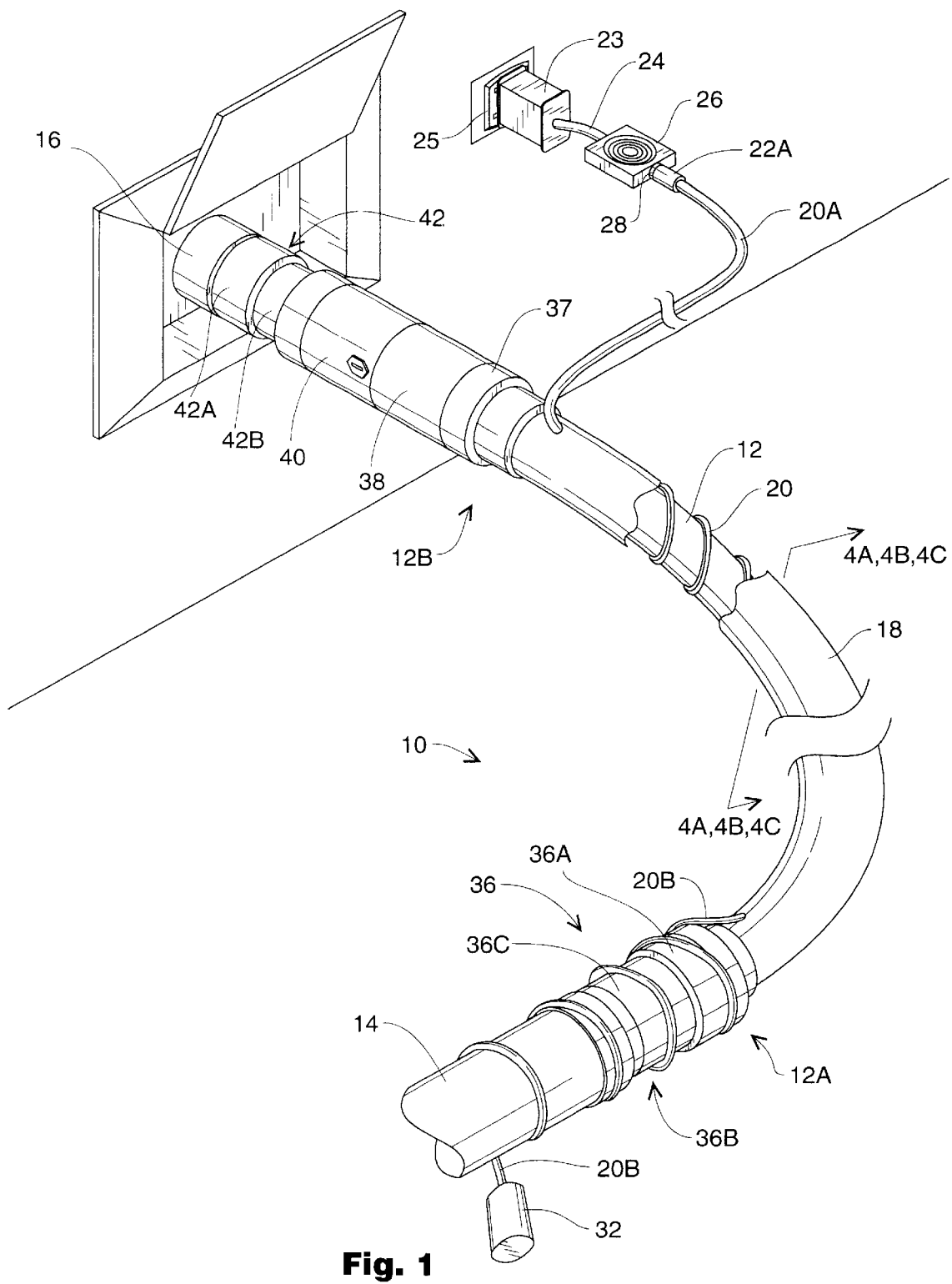
FIG. 1 is a perspective view of a water conveyance.
Figure 2:
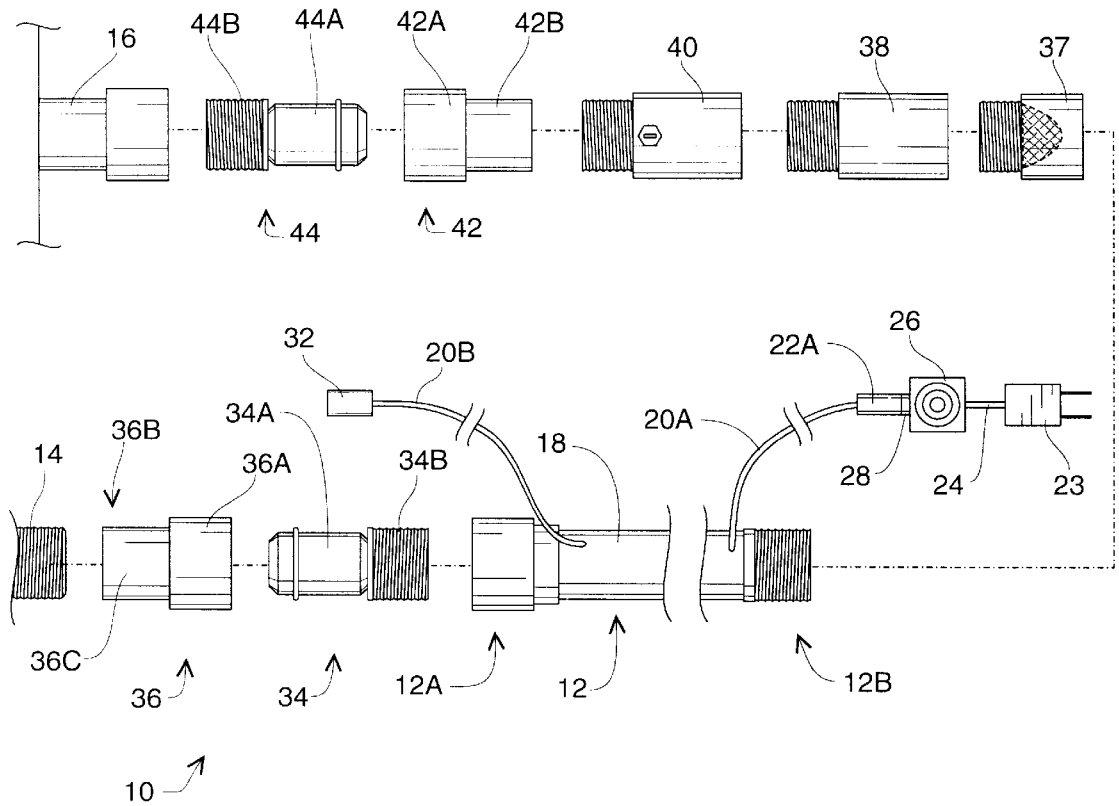
FIG. 2 is an elevational exploded view of the water conveyance.
Figure 4A:
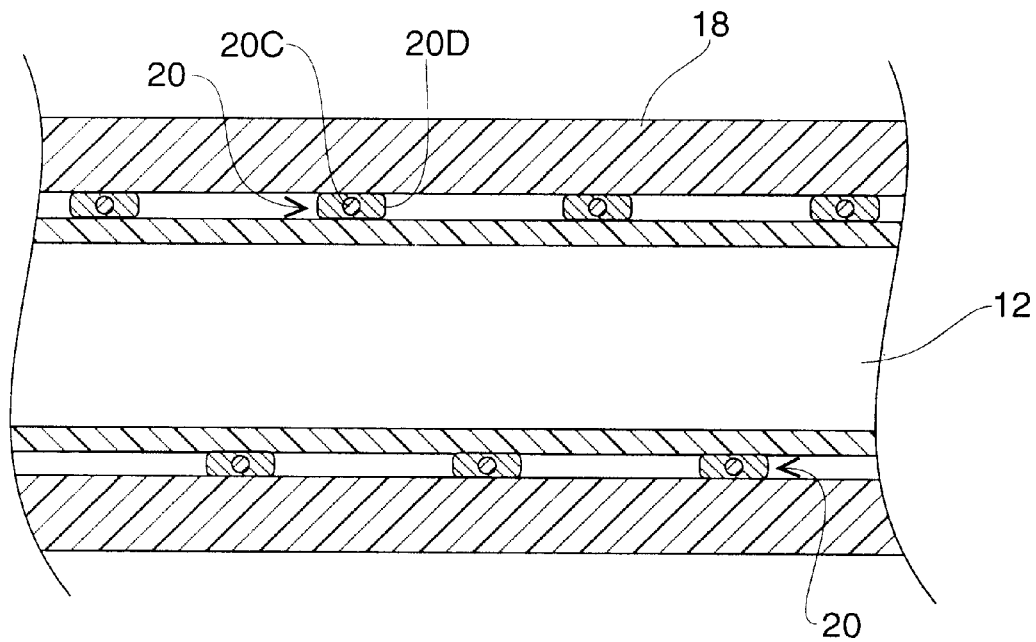
FIGS. 4A–4C are alternative cross-sectional views taken along line 4A, 4B, 4C—4A. 4B, 4C.
Figure 4B:
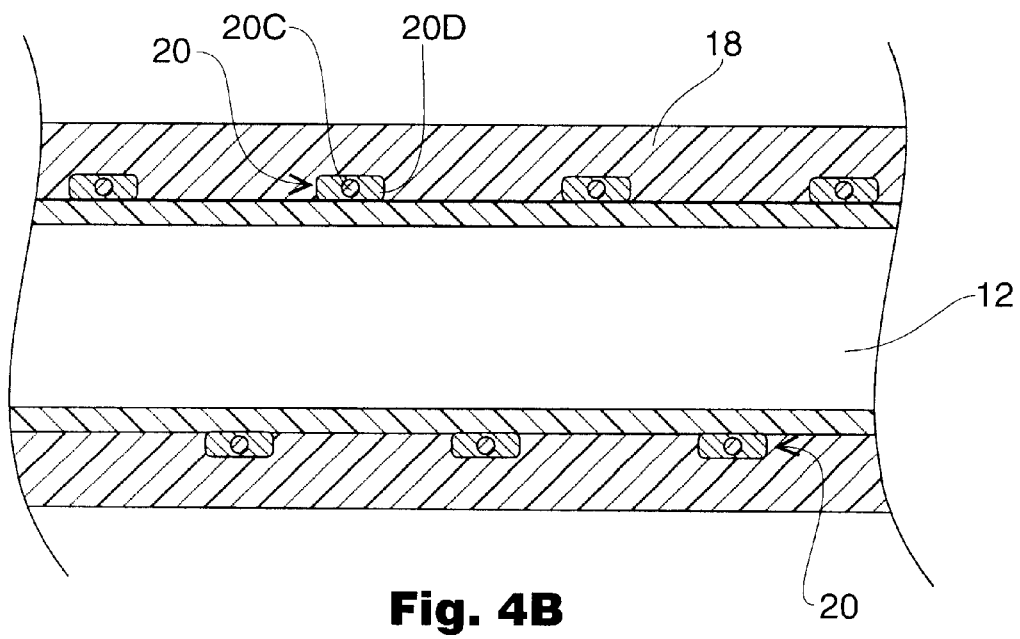
Figure 4C:
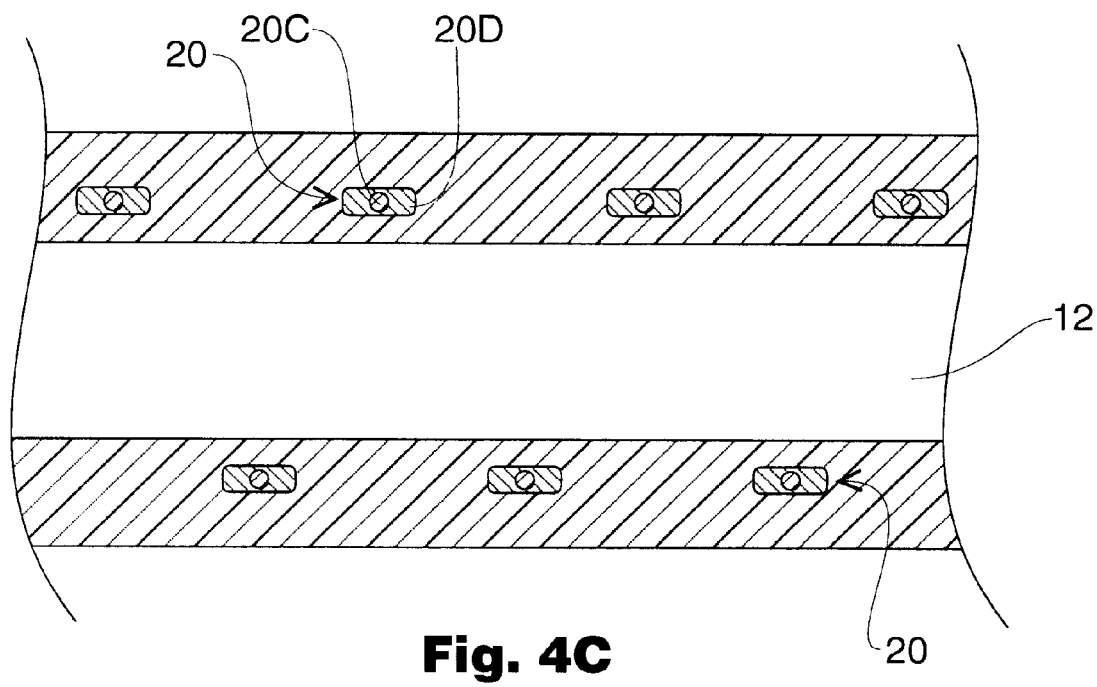

FIG. 1 is a perspective view of a water conveyance 10, comprising a fluid conduit 12 such as a rubber hose, having a first end 12A connected to a water source 14 such as a hose bibb as shown, and a second end 12B connected to a receiving connection 16 such as an inlet to a trailer potable water system, as shown. FIG. 2 is an elevational exploded view of the water conveyance 10. FIGS. 4A–4C are alternative cross-sectional views taken along line 4A,4B,4C—4A,4B,4C. Referring to FIGS. 1, 2, 4A and 4B, an insulating cover 18 surrounds the fluid conduit 12. In FIG. 4A, an elongated heat trace tape 20 is captured between the insulating cover 18 and the fluid conduit 12. In FIG. 4B, an alternative embodiment is shown in which the heat trace tape 20 is embedded within the insulating cover 18. In both embodiments, the heat trace tape 20 is positioned to provide heat to fluid (not shown) flowing within the fluid conduit 12, to prevent the fluid from freezing.

In FIG. 4C, the insulating cover 18 is deleted, and the fluid conduit 12 acts as a conveyance and an insulator for the fluid. In this embodiment, the heat trace tape 20 is embedded within the fluid conduit 12.

Heat trace tape 20 is known in the art, and comprises a heating element 20C within a flexible casing 20D (referring to FIGS. 4A and 4B). A well known heat trace tape product is RAY-CHEM (™) heat trace. Alternatively, the portion of the heating element 20C beneath or embedded within the insulating cover, or embedded within the fluid conduit, may have the flexible casing 20D deleted. This will require greater care when positioning the heating element 20C to avoid potential short circuits.

An insulated source conductor 20A extends outwardly from the insulating cover 18 near the second end 12B of the fluid conduit 12.

Figure 3:
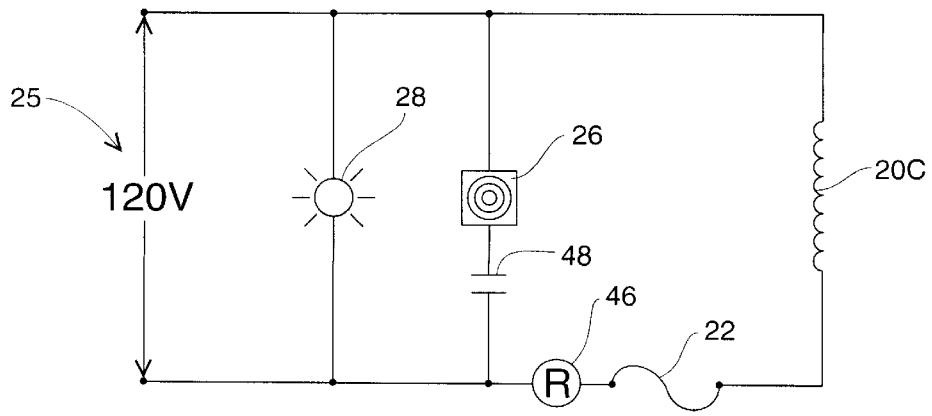
FIG. 3 is an electrical schematic showing the wiring of the heat trace tape.

FIG. 3 is an electrical schematic showing the wiring of the heat trace tape 20. Referring to FIGS. 1–3, the source conductor 20A is terminated by a fuse 22 within a fuse case 22A. The fuse 22 is configured in a known manner to prevent current through the heat trace tape 20 from exceeding a pre-determined amount. A plug 23 and a power cord 24 convey power from a power source 25 through the source conductor 20A to the heat trace tape 20.

A relay 46 is provided in series with the heating element 20C of the heat trace tape 20. A pair of contacts 48 is provided in series with an alarm 26, and in parallel with the relay 46. The contacts 48 are held open by the relay 46. When current ceases to flow through the relay 46, the contacts 48 close and the alarm 26 sounds to indicate that current is no longer flowing through the heating element 20C.

A light emitting diode 28 is wired in parallel to the heating element 20C, and energizes when the plug 23 is connected to the power source 25. The diode 28 and the alarm 26 are disposed between the plug 23 and the fuse 22.

Referring now primarily to FIGS. 1 and 2, a tail end 20B of the heat trace tape 20 extends outwardly from the insulating cover 18 near the first end 12A of the fluid conduit 12. The tail end 20B of the heat trace tape 20 is terminated by a waterproof end cap 32, which is well known in the art and common for heat trace tape 20.

A first quick-connect first half 34 includes a plug end 34A and a threaded end 34B. The threaded end 34B is threadedly connectable to the first end 12A. A first quick-connect second half 36 includes a female end 36A and a threaded end 36B. The threaded end 36B of the first quick-connect second half 36 is adapted to threadedly connect to the water source 14. The plug end 34A of the first quick-connect first half 34 is configured in a known manner to releasably connect to the female end 36A of the first quick-connect second half 36. Quick-connects are well known in the art. For example, and not by way of limitation, such devices are often used in laboratory compressed air systems. Such devices are usually connected by pushing the plug end 34A into the female end 36A. Such devices are usually disconnected by sliding a sleeve 36C of the female end 36A away from the plug end 34A.

The first quick-connect first half 34 may be left threaded onto the first end 12A, and the first quick-connect second half 36 may be left threaded onto the water source 14. This will permit quick connection and disconnection of the fluid conduit 12 onto the water source 14 whenever desired.

An in-line strainer 37 is threadedly connectable to the second end 12B. A pressure regulator 38 is threadedly connectable to the in-line strainer 37. A back-flow preventer 40 is threadedly connectable to the pressure regulator 38. A screw adjustment as is known in the art is shown on the back-flow preventer 40. Strainers, pressure regulators and back-flow preventers are well known in the art.

A second quick-connect second half 42 is threadedly connectable to the second end 12B. A second quick-connect first half 44 is threadedly connectable to the receiving connection 16. The second quick-connect first half 44 is configured to releasably connect to the second quick-connect second half 42 in the same manner as described above for the first quick-connect first half 34 and the first quick-connect second half 36.

The in-line strainer 37, the pressure regulator 38, the back-flow preventer 40, and the second quick-connect first and second halves 44, 42 are connectable in any desired sequence. Of course, the second quick-connect first and second halves 44, 42 must be connected adjacent each other.

To use the invention, a person connects the components of the water conveyance 10 in the manner illustrated, plugs the heat trace tape 20 into the power source 25, and wraps the tail end 20B about the water source 14 and the connection between the water source 14 and the fluid conduit 12, as shown in FIG. 1. The tail end 20B and the components about which it is wrapped should then be insulated using split piping insulation (not shown) or other means.

The foregoing description is included to describe embodiments of the present invention which include the preferred embodiment, and is not meant to limit the scope of the invention.

From the foregoing description, many variations will be apparent to those skilled in the art that would be encompassed by the spirit and scope of the invention. For example, and not by way of limitation, the pilot light and alarm may be located within the trailer to indicate the status of the heat trace. As a further example and not by way of limitation, the heat trace tape may be connected to the rubber hoses in an engine cooling system, which travel to and from a vehicle's radiator or heat exchanger. An in-line circulating pump could be provided to keep coolant flowing through the hoses, the engine block, and the radiator or heat exchanger whenever a thermostat calls for the heat trace to energize.

As a further example of a modification which would be within the scope of the present invention, and not by way of limitation, the plug may be deleted and the power cord may be directly connected to an electrical current conductor.

Accordingly, the scope of the invention is to be limited only by the following claims and their legal equivalents.

The invention claimed is:

1. A water conveyance comprising:
  a. a fluid conduit means for conveying and insulating fluid;
  b. a heating means embedded within the fluid conduit means;
  c. power means for conveying power from a power source to the heating means;
  d. a fuse electrically connected in series with the heating means and configured to open when current through the fuse exceeds a pre-determined amount, thereby halting the current through the heating means;
  e. an alarm configured to energize when the fuse opens, to audibly indicate that current through the heating means is halted; and
  f. a light source electrically connected to the heating means and adapted to energize when the power means is connected to the power source.

2. A water conveyance comprising:
  a. a fluid conduit having a first end and a second end, and adapted to convey water from a water source to a receiving connection;
  b. an insulating cover surrounding the fluid conduit;
  c. an elongated heat trace tape captured between the insulating, cover and the fluid conduit;
  d. a source conductor extending outwardly from the insulating cover near the second end of the fluid conduit, and electrically connected to the heat trace tape;
  e. the source conductor terminated by a fuse configured to prevent current through the heat trace tape from exceeding, a pre-determined amount;
  f. a plug and power cord adapted to convey power from a power source through the source conductor to the heat trace tape;
  g. an alarm electrically connected to the heat trace tape and configured to energize when current through the heat trace tape is halted;
  h. a light emitting diode electrically connected to the heat trace tape and adapted to energize when the plug is connected to the power source;
  i. a tail end of the heat trace tape extending outwardly from the insulating cover near the first end of the fluid conduit; and
  j. the tail end of the heat trace tape terminated by a waterproof end cap.

3. A water conveyance comprising:
  a. a fluid conduit having a first end and a second end, and adapted to convey water from a water source to a receiving connection;
  b. an insulating cover surrounding the fluid conduit;
  c. an elongated heat trace tape embedded within the insulating cover and disposed adjacent the fluid conduit;
  d. a source conductor extending outwardly from the insulating cover near the second end of the fluid conduit and electrically connected to the heat trace tape;
  e. the source conductor terminated by a fuse configured to prevent current through the heat trace tape from exceeding a pre-determined amount;
  f. a plug and power cord adapted to convey power from a power source through the source conductor to the heat trace tape;
  g. an alarm electrically connected to the heat trace tape and configured to energize when current through the heat trace tape is halted;
  h. a light emitting diode electrically connected to the heat trace tape and adapted to energize when the plug is connected to the power source;
  i. the diode and the alarm disposed between the plug and the fuse;
  j. a tail end of the heat trace tape extending outwardly from the insulating cover near the first end of the fluid conduit;

k. the tail end of the heat trace tape terminated by a waterproof end cap;

l. a first quick-connect first half threadedly connectable to the first end;

m. a first quick-connect second half adapted to threadedly connect to the water source;

n. the first quick-connect first half configured to releasably connect to the first quick-connect second half;

o. an in-line strainer threadedly connectable to the second end;

p. a pressure regulator threadedly connectable to the in-line strainer;

q. a back-flow preventer threadedly connectable to the pressure regulator;

r. a second quick-connect first half threadedly connectable to the receiving connection;

s. a second quick-connect second half threadedly connectable to the back-flow preventer; and t. the second quick-connect first half configured to releasably connect to the second quick-connect second half.

* * * * *